(12) United States Patent
Sun et al.

(10) Patent No.: US 8,628,654 B2
(45) Date of Patent: Jan. 14, 2014

(54) LIQUID TREATMENT MODULE

(75) Inventors: Xiaowei Sun, Changzhou (CN);
Xiaoming Sun, Changzhou (CN);
Huanqing Shao, Changzhou (CN);
Borong Zhan, Changzhou (CN)

(73) Assignee: Changzhou Est Purification Equipment Co. Ltd. (CN)

( * ) Notice: Subject to any disclaimer, the term of this patent is extended or adjusted under 35 U.S.C. 154(b) by 934 days.

(21) Appl. No.: 12/448,841

(22) PCT Filed: Nov. 30, 2007

(86) PCT No.: PCT/CN2007/003401
§ 371 (c)(1),
(2), (4) Date: Jul. 8, 2009

(87) PCT Pub. No.: WO2008/083546
PCT Pub. Date: Jul. 17, 2008

(65) Prior Publication Data
US 2010/0059382 A1    Mar. 11, 2010

(30) Foreign Application Priority Data
Jan. 11, 2007    (CN) .......................... 2007 1 0019276

(51) Int. Cl.
*B03C 9/00*    (2006.01)
(52) U.S. Cl.
USPC ............ 204/665; 204/660; 204/672; 204/673
(58) Field of Classification Search
USPC .................... 204/660, 665, 672, 673
See application file for complete search history.

(56) References Cited

U.S. PATENT DOCUMENTS 3,590,172 A * 6/1971 Dehn .............................. 191/32
4,046,604 A * 9/1977 Yamagishi et al. ........... 148/522
4,692,229 A * 9/1987 Bjareklint et al. ............ 205/754

(Continued)

FOREIGN PATENT DOCUMENTS

| CN | 2463054 Y | 5/2001 |
|----|-----------|--------|
| CN | 1401586   | 3/2003 |

(Continued)

OTHER PUBLICATIONS

English language abstract of CN 1401586, 1 page.

(Continued)

*Primary Examiner* — Keith Hendricks
*Assistant Examiner* — Salil Jain

(57) ABSTRACT

The present invention relates to a liquid treatment module, which comprises power distribution panels, electrode plates and a framework with side plates. The two power distribution panels are fixed on the two side plates. The power distribution panels have electrode plates located on inner side of the panels. There are two or more double-sided electrode plates placed in stacks between the two distribution panels which are connected to the DC power supply through the electric wires. There are separators placed between the adjacent electrode plates to provide the flow channels. Each flow channel is connected with the inlet and outlet holes on the side plates. The exposed surface of the power distribution panels, double-sided electrode plates and the separators are bonded and sealed by the insulating package. This invention has characteristics of simple structure, large liquid handling capacity, high efficiency, and can be used to process liquids of various kinds including water, wine, fruit juices, beverages, dairy products and chemical wastes from various sources for impurities removal.

16 Claims, 6 Drawing Sheets

(56) References Cited

U.S. PATENT DOCUMENTS

| | | | |
|---|---|---|---|
| 4,923,582 A * | 5/1990 | Abrahamson et al. | 204/255 |
| 5,147,614 A * | 9/1992 | Conrad | 422/186.18 |
| 5,450,279 A * | 9/1995 | Yoshida et al. | 361/502 |
| 5,954,937 A * | 9/1999 | Farmer | 205/687 |
| 6,038,768 A * | 3/2000 | Rhodes | 29/890.043 |
| 6,365,023 B1 * | 4/2002 | De Los Reyes et al. | 204/524 |
| 6,433,444 B1 * | 8/2002 | de Vries | 307/64 |
| 7,368,191 B2 * | 5/2008 | Andelman et al. | 429/523 |
| 2004/0174657 A1 * | 9/2004 | Andelman et al. | 361/503 |

FOREIGN PATENT DOCUMENTS

| | | |
|---|---|---|
| CN | 2601250 | 1/2004 |
| CN | 100999346 | 7/2007 |
| FR | 2547573 | 12/1984 |
| WO | WO 01/96245 | 12/2001 |

OTHER PUBLICATIONS

English language abstract of FR 2547573, 1 page.

English language abstract of CN 100999346, 1 page.

English language abstract of CN 2601250, 1 page.

English Abstract of CN 2463054, published May 12, 2012, Gaode Carben Purification Tech (1 page).

* cited by examiner

E-E

LIQUID TREATMENT MODULE

CROSS REFERENCE TO RELATED APPLICATIONS

The present application is the U.S. national stage of International Application PCT/CN2007/003401, filed on Nov. 30, 2007, which claims priority to Chinese Patent Application No. 200710019276.4, filed on Jan. 11, 2007. The aforementioned patent applications are hereby incorporated by reference in their entirety.

TECHNICAL FIELD

This invention relates to modules of a liquid treatment device for impurity removal.

TECHNICAL BACKGROUND

There are many methods for liquid treatments to remove impurities, especially for water treatment. Typical treatment methods include distillation, reverse osmosis, electrodialysis, ion exchange, and freezing. Among them, the major methods utilized for large industrial scale applications include:

(1) Ion exchange: It uses ion exchange resins to treat liquid. The price of ion exchange resins is very high, and the process needs strong acids and alkali for resin regeneration, which produces secondary pollution. Moreover, the maintenance of the equipment is complicated.

(2) Reverse osmosis: This is the most commonly used industrial water purification method. It has advantages such as high desalination rate, simple process, etc. However, the macromolecule membranes are easily polluted and fouled by the organic substances, calcium and chlorine in water. It requires very restrictive pre-treatment system and the addition of several types of antioxidant and anti-scale inhibitor. These increase the complexity of the treatment system, and may cause troubles in system operation and maintenance.

(3) Electrodialysis: It is composed of the electrode plates, separation membrane, and ion exchange resins. Under the attraction forces of a DC electrical field, ions move through the membranes and are adsorbed on the ion exchange resins. However, the incorporated membranes are easily fouled, like in the reverse osmosis. Also, such treatment can only get rid of ions, and it has no effects on organic substances, colloid particles or other particles, or suspended solids. Moreover, the equipment consumes lots of energy due to the water electrolysis on the electrode plates.

A published patent CN2463054Y titled "Module for liquid treatment and purification" claims that the module has a function of self-regeneration and it addresses the problems of high energy consumption, and membrane fouling as well as the high system pressure. The module includes at least a pair of parallel power distribution panels, insulation baffles, electrode plates, power distribution components, and liquid inlet and outlet holes on the side plates. When a DC power is supplied on the positive and negative plates through the power distribution components and the power distribution plates, with the liquid to be processed passing through the positive and negative electrode plates, the impurity ions and charged particles in the liquids migrate to the positive and negative electrodes, and they are stored in the electric double layer on the electrode surface. Thus, the impurity ions and electrically charged particles and molecules in the liquid are removed from the processed liquid. When the positive and negative electrodes are shorted, the ions and charged particles stored in the electric double layer return to the liquid channel due to the disappearance of direct current electric field and the formation of the internal loop. The ions, molecules and particles are discharged with the washing liquid. The adsorbed organic matters on the electrodes can be decomposed when the electric field was applied. All the impurities are discharged from the electrodes at the regeneration stage and the electrodes can be re-utilized afterwards.

The structure of the liquid treatment modules described in CN2463054Y has the following shortcomings:

1) It can only handle a small amount of liquid. Because there are lots of power distribution panels, there are only limited space left to accommodate the electrode plates for liquid treatment. Hence the total handling capacity is limited;

2) The module structure is complex. Because the system requires multiple power distribution plates, each of which requires its own component, the reliability is reduced; and 3) Operating current is very large. The power distribution plates are connected to the DC power supply through their own distribution components. The large working current requires large power supply system, and thus, the manufacturing costs of the treatment devices increase.

SUMMARY OF THE INVENTION

The present invention provides the means to make a liquid treatment module that has a simple structure, can handle a large amount of fluid and has highly improved efficiency.

The technical strategy of the present invention is realized by the following in a liquid treatment module, including power distribution panels, electrode panels, and a framework with side plates. The liquid treatment module is characterized by the two power distribution panels are fixed on the side plates by connecting pieces. The electrode plates of the power distribution panels are placed on the inside the distribution panels. The power distribution panels are connected to the DC power supply through the electrical wires. Two or more double-sided electrode plates are stacked between the two power distribution panels. There are separators between the adjacent double-sided electrode plates to provide channels for liquid flow, and the flow channels are connected to the inlet and outlet holes on both side panels. The power distribution panels, double-sided electrode plates, and the separator are bonded, supported, sealed and insulated by the package.

This invention has the following advantages:

1) It can deal with a large quantity of liquid. The present invention only needs two power distribution panels, and a number of double-sided electrode plates are stacked between the two distribution panels. Lots of electrode plates could be placed for liquid treatment, so that the liquid handling capability is greatly improved.

2) Simple structure. The present invention only needs two distribution panels for imposing current. The power distribution panels are connected to the power supply through the electric wires. Because the power is supplied in series, such arrangement can greatly reduce the operating current, simplify the power supply system, and improve the reliability of fluid treatment modules.

3) Reliable connection. The present invention uses the package to bond, support, seal and insulate power distribution panels, double-sided electrode plates and the separators. The packaging not only conveniently provides the good insulation between the distribution plate and the double-sided electrode plates, but also fixes separators and the double-sided electrode plates at locations and improves the mechanical strength of the module.

4) High treatment efficiency. The invention has separators between the adjacent electrode plates to separate the two plates. The liquid flow streams are static mixed through the turbulence resulted from the separator with specific design. This arrangement can speed up the liquid flow in the liquid channel and improves the opportunity for contaminating ions and charged particles in liquid to migrate closer to electrodes which can accelerate their movements toward the positive and negative electrodes under the applied electric field. The impurities of ions, charged particles and organic matters in liquid are stored in the electrode double-layer of the electrodes and are hence removed from the flowing liquid. The handling capacity of the module is then improved.

BRIEF DESCRIPTION OF THE FIGURES

The following graphs describe the implementation of the present invention in detail.

Whereas:
1—side plate, 2—power distribution panel, 21—insulation plate, 22—conductor, 22-1—connection part, 22-2—securing part, 22-3—electrical power distribution part, 23—collector plate, 24—electrode plate, 25—pipe guiding hole, 26—transition layer, 3—connection part, 4—double—sided electrode plate, 41—conductive plate, 42—electrode plate, 43—pipe guiding hole, 5—framework, 6—intermediate power distribution panel, 61—insulation plate, 62—conductor, 62-1—connection part, 62-2—securing part, 62-3—electrical power distribution part, 63—collector plate, 64—electrode plate, 65—pipe guiding hole, 66—transition layer, 7—flange, 8—liquid distributing pipe, 81—sealing head, 82—outer pipe, 83—inner pipe, 84—cover, 9—package, and 10—separator.

DETAILED DESCRIPTION OF PREFERRED EMBODIMENTS

The liquid treatment device of the present invention is shown in FIGS. 1 to 4, including the power distribution panels 2, electrode plates, and frameworks 5 with two side end plates 1.

Figure 1:
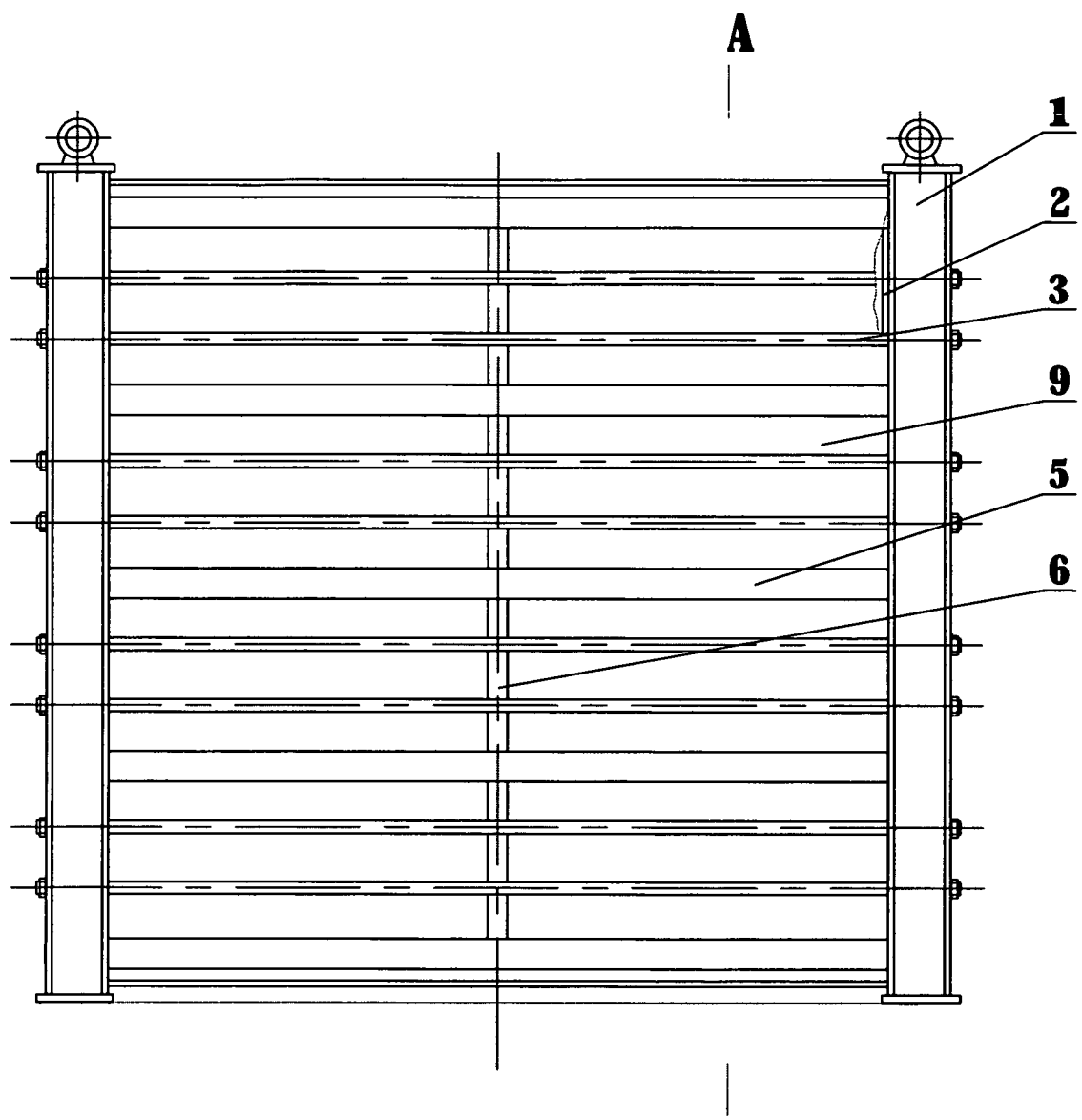
FIG. 1 is a schematic diagram of the structure of the invention.

As shown in FIG. 1, the two power distribution panels 2 are connected to the end plates 1 through the connector 3. Inside of the power distribution panels 2 is the electrode plate 24. The power distribution panels 2 are connected with the DC power supply through electrical wires. The power distribution panels 2 of the present invention may be conductive metal plates, and connect to the DC power supply through the electrical wires.

Figure 5:
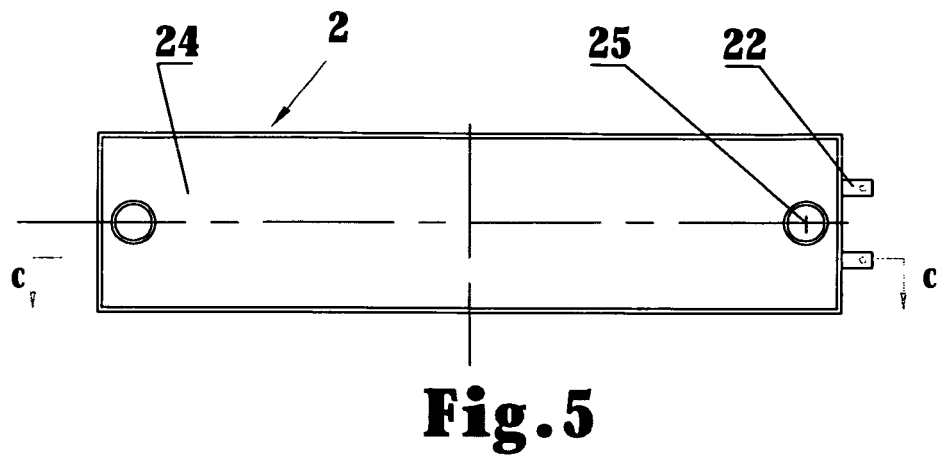
FIG. 5 is a schematic diagram of the power distribution panels.
Figure 6:
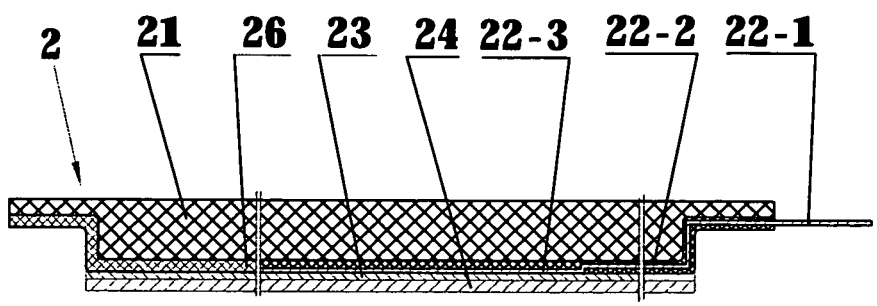
FIG. 6 is a schematic diagram of the enlarged C-C cutaway view in FIG. 5.

Alternatively, as shown in FIGS. 5 and 6, the power distribution plate can be made of the insulation plates 21 and sequentially on top of the inner side of the insulation plate 21, the conductive plate 22, the collector plate 23 and the electrode plate 24. There is also a transition layer 26 on the surface of the insulation plate 21. The conductor 22 is anchored to the securing part 22-2 on top of the transition layer 26 and the electrical power distribution part 22-3 on the surface of transition layer 26 through the connecting part 22-1 on the outside part of transition layer 26. Conductor 22 is connected to the DC power supply through the electrical wires. The collector plate 23 can be made of graphite foil to reduce manufacturing costs, and to provide good bonding affinity with the package 9 and the power distribution panels 2.

Figure 4:
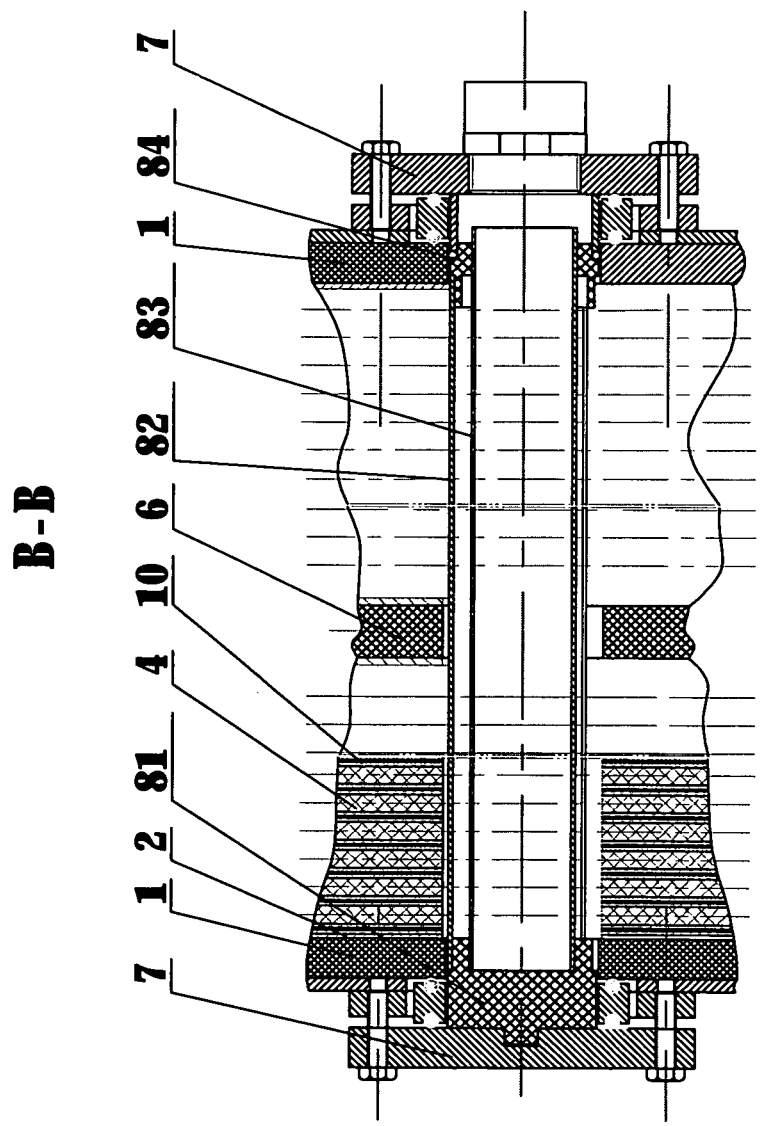
FIG. 4 is a schematic diagram of the enlarged B-B cutaway view in FIG. 1.
Figure 7:
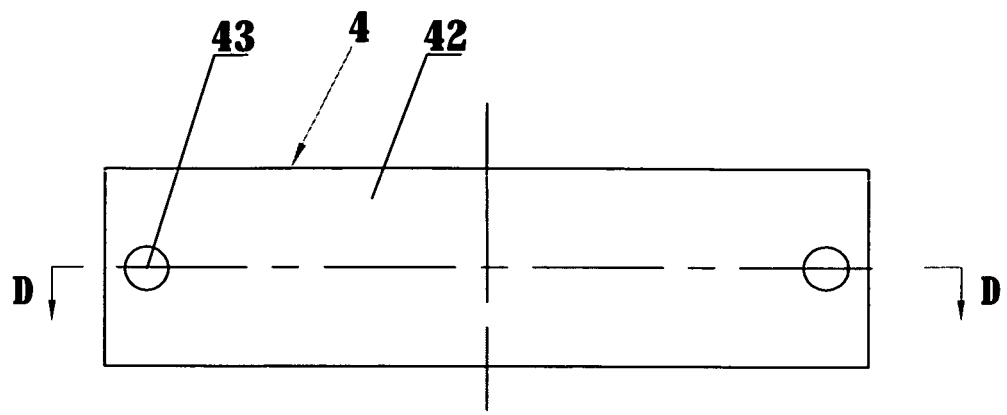
FIG. 7 is a schematic diagram of the double-sided electrode plates.
Figure 8:
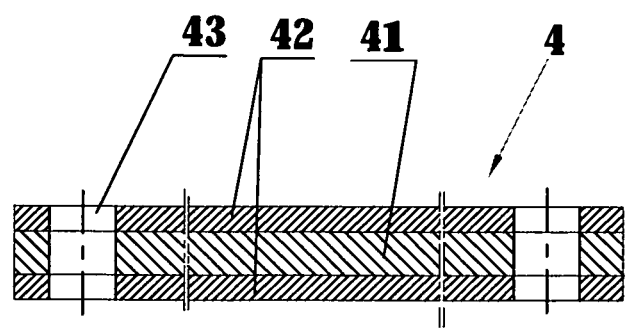
FIG. 8 is a schematic diagram of the enlarged D-D cutaway view in FIG. 7.

As shown in FIG. 4, more than two double-sided electrode plates 4 are stacked in between the two power distribution panels 2. The double-sided electrode plate 4, as shown in FIGS. 7 and 8, comprise a conductive plate 41 with electrode plates 42 bonded on the two sides of the conductive plate 41. The conductive plate 41 is made of graphite foil. The quantity of double-sided electrode plates to stack between the power distribution panels can be set in accordance with the treatment capacity. The present invention can use 2 to 10,000 pieces of double-sided electrode plates 4, preferably 10 to 1000 pieces, and most preferably 50 to 500 pieces between the power distribution panels. When the power is supplied to the power distribution panels 2, the double-sided electrode plates 4 set in between the distribution panels 2 are charged to start working. Because the power is supplied onto the power distribution panels 2 in series, it greatly reduces the operating current and simplifies the structure of power distribution system.

As shown in FIG. 4, there are separators 10 between the electrode plates 4 to separate the electrodes and to provide flow channels for liquid in between adjacent electrode plates 4. All the flow channels are connected to the inlet and outlet holes on the end plates 1.

Figure 2:
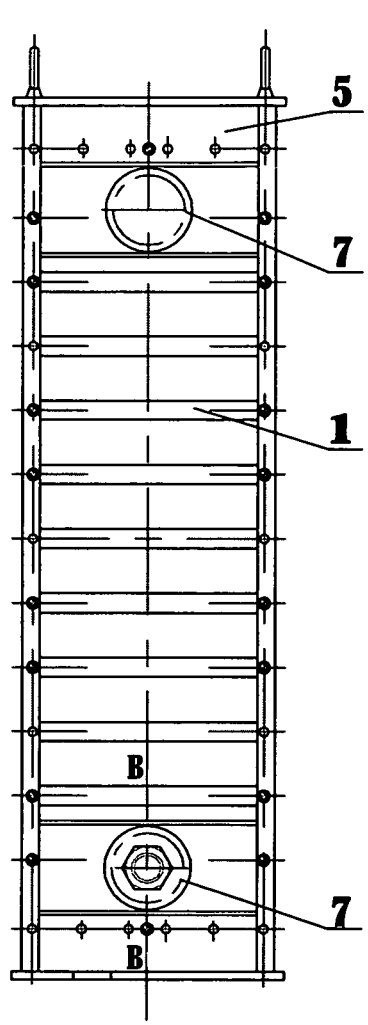
FIG. 2 is a schematic diagram of the side structure.
Figure 3:
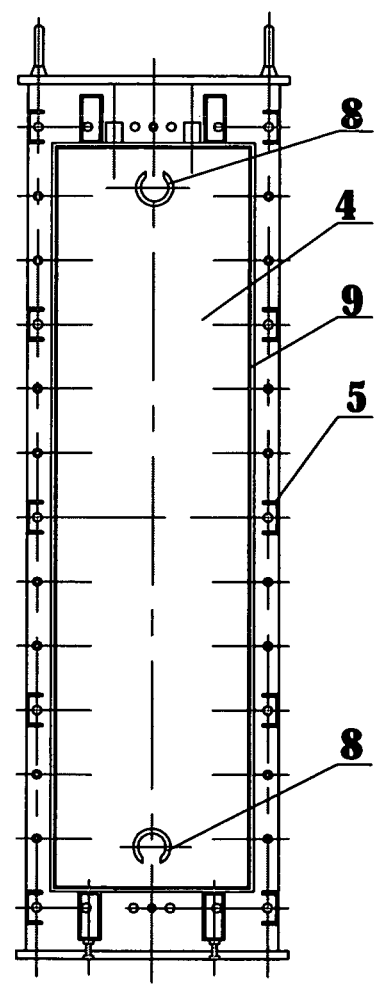
FIG. 3 is a schematic diagram of the A-A cutaway view in FIG. 1.

As shown from FIGS. 1 to 3, the exposed parts of the power distribution panels 2, double-sided electrode plates 4 and the separator 10 are bonded by package 9. The package 9 plays the roles of physical supporting, sealing and insulation, and has also increased the mechanical strength of the modules.

Figure 9:
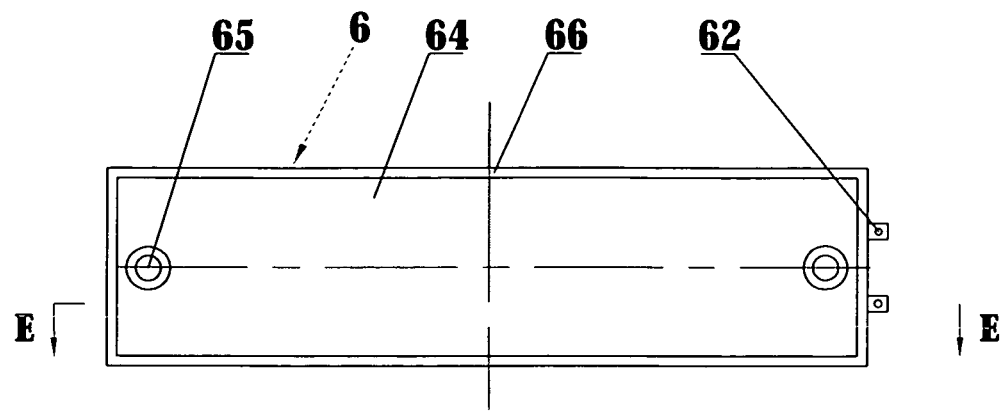
FIG. 9 is a schematic diagram of the intermediate electrical panels.
Figure 10:
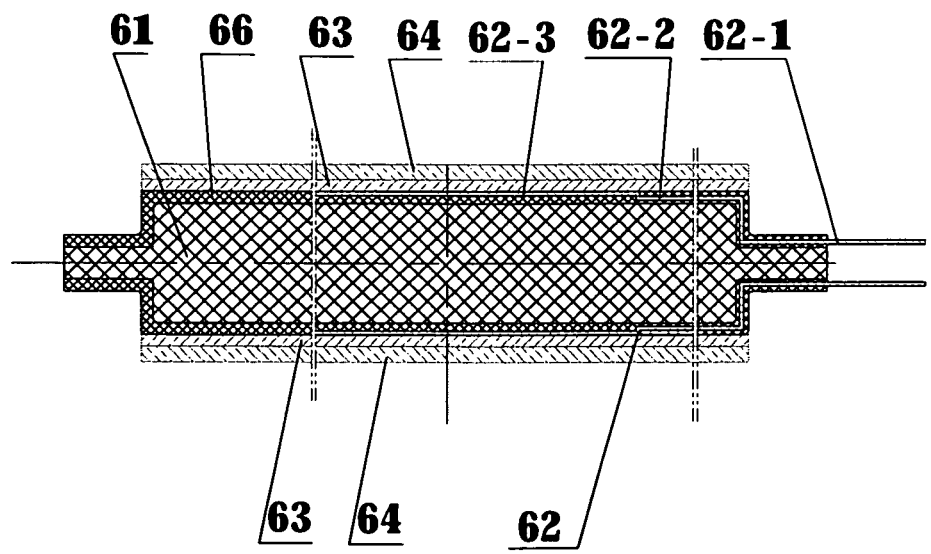
FIG. 10 is a schematic diagram of the enlarged E-E cutaway view in FIG. 9.

To further enhance the handling capacity, as shown in FIG. 9-10, the present invention has one or more intermediate power distribution panels 6, which have electrode plates 64 on both sides, placed between the stacks of double-sided electrode plates 4. The intermediate power distribution panels 6 can be conductive metal plates and are connected to the DC power supply. In alternative, the intermediate power distribution panel 6 is comprised of the insulating substrate 61, the conductor 62 and collector plates 63. The conductors 62 and collector plates 63 are sequentially placed on both sides of the insulating substrates 61. There is also a transition layer 66 on the surface of the insulating substrates 61.

The conductor 62 is fixed on the securing part 62-2 on top of the transition layer 66 and the power distribution part 62-3 on the surface of transition layer 66 through the connecting part 62-1 on the outside part of transition layer 66. Conductor 62 is connected to the power supply through electrical wires, while the collector plate 63 uses graphite foil for its connection to the electrode plates 64. This configuration could also achieve a reduction in manufacturing costs, and provides a good bonding affinity to the package 9 and the intermediate power distribution panels 6. When the power is supplied to the power distribution panels 2 and intermediate power distribution panels 6, the current is also supplied to the two or more double-sided electrode plates located between the power distribution panel 2 and the intermediate power distribution panel 6.

As shown in FIGS. 1 and 4, the separator 10 has at least one layer of non-conductive materials with small holes or openings in the sheet like nets. The separator can be made into bags with the double-sided electrode plate 4 placed in the bag and the four sides sealed. The hole can be in various shapes with openings in the range of 0.01~10 mm, preferably between 0.05~5 mm, and most preferably between 0.1~3 mm. Alternatively, the separator can be one or more plates with grooves, ripples, openings, or wings, or one or more soft panels such as sponge. Separator 10 shall provide liquid passage channels. Fillers and ion exchange resins can be placed in the channels to increase the turbulence of the flow. Turbulence helps mixing and can increase the treatment efficiency.

When the liquid to be processed flows through the flow channels between the electrode plates under the DC electric field, the ions, organic matter, suspended solids and colloidal particles in the liquid are removed. When the electrodes reach saturated or near the saturation point, the electrical circuit is shorted. Due to the disappearance of direct current electric field and the formation of the internal loop, the ions and charged particles stored in the electric double layer of the electrode surface return to the liquid flow channel and are discharged with the regeneration flow. The adsorbed organic matters are decomposed on the electrodes under the electric field to form carbon dioxide, inorganic acid, water, of which carbon dioxide and inorganic acid are stored in the electrodes in the form of acid radical, and are discharged with the washing liquid at the regeneration stage. After the ions and charged species are removed from the system, the electrodes are regenerated.

The liquid treatment modules of this invention have two liquid distributing pipes 8. The two liquid distributing pipes 8 penetrate the two end plates 1 through the inlet and outlet holes and are sealed and fastened to the end plates 1 by the flange 7. The liquid distributing pipes 8 allows the liquid to flow through the module from the top of the electrode plates to enter the liquid flow channel or from the two liquid distributing pipes passing through the liquid inlet and outlet holes on the side plates 1, the pipe guiding holes 25 of the power distribution panel 2, the pipe guiding holes 43 of the double-sided electrode plates 4, and are fastened to the end plates by flange 7.

When the modules are equipped with the intermediate power distribution panels, as shown in FIGS. 2 and 4, the two liquid distributing pipes 8 can pass through the inlet and outlet holes on the side plates 1, the pipe guiding holes 25 of the distribution panels, the pipe guiding holes 43 of the double-sided electrode plates 4, and the pipe guiding holes 65 of the intermediate power distribution panels 6. The two sides of the liquid distributing pipes 8 are connected to the side plates 1 through two flanges 7. This flow system allows liquid to flow from the liquid distributing pipes 8 directly into the flow channels between the electrodes.

As shown in FIG. 4, a liquid distributing pipe 8 comprises an outer pipe 82 and an inner pipe 83 which is located inside of the outer pipe 82 with the same axis. The outer pipe 82 has slit along the axis for liquid to flow in and out. The two outer pipes 82 have liquid flow slits in the opposite directions, one up and one down. The inner pipe 83 has the slit in opposite direction with its corresponding outer pipe 82. This design allows the adjustment of flow speed and the uniform distribution of the fluid flow. One end of the outer pipe 82 and inner pipe 83 are tightly connected by using the sealing head 81, the other end of the outer pipe 82 and the inner pipe 83 are connected and sealed by the cover 84. External pipes are connected to the inner pipe 83 through the cover 84. The liquid to be processed passes through inner pipe 83, outer pipe 82, and finally flows into the liquid channel between the electrodes.

The liquid treatment modules of present invention can be used to process liquids of various kinds including water, wine, fruit juices, beverages, dairy products and chemical wastes from various sources.

The invention claimed is:

1. A liquid treatment module, comprising at least two power distribution panels (2), electrode plates, and a framework (5) with two side plates (1), wherein the liquid treatment module has the following characteristics:
   a) the at least two power distribution panels (2) are dimensioned for attachment to the two side plates (1) by connectors (3), each of the at least two power distribution panels (2) having two pipe guiding holes (25);
   b) respective electrode plates (24) are connected to an inside part of each of the at least two power distribution panels (2), wherein each of the at least two power distribution panels (2) has an outside panel surface opposite to the inside part, and each of the two power distribution panels (2) is comprised of an insulation plate (21), the insulation plate (21) having a first plate surface for providing the outside panel surface, and a second plate surface attached to a conductor (22) and a collector plate (23) in sequence;
   c) two or more double-sided electrode plates (4) are stacked between the at least two power distribution panels (2);
   d) the at least two power distribution panels (2) are connectable to a DC power supply by electrical wires;
   e) a separator (10) is placed between at least two or more neighboring plates of said two or more double-sided electrode plates (4) to provide one or more liquid channels for liquid to pass through;
   f) each liquid channel is connected to two inlet and outlet holes on the side plates (1) through the two pipe guiding holes (25); and
   g) exposed surfaces of the at least two power distribution panels (2), the double-sided electrode plates (4) and the separator (10) are bonded to a package (9) to provide support, seal and insulation.

2. The liquid treatment module of claim 1, wherein the at least two power distribution panels (2) are metallic conductive panels.

3. The liquid treatment module of claim 1, wherein each plate of the two or more double-sided electrode plates (4) is comprised of a conductor plate (41) and two electrode plates (42) attached to the two sides of the conductor plate (41).

4. The liquid treatment module of claim 1, wherein there is at least one intermediate power distribution panel (6) placed between the double-sided electrode plates (4) with electrode plates (64) on both sides of the intermediate power distribution panel.

5. The liquid treatment module of claim 4, wherein the at least one intermediate power distribution panel (6) is made of metallic conductive plates.

6. The liquid treatment module of claim 4, wherein the at least one intermediate power distribution panel (6) is comprised of an insulation plate (61), and conductors (62) and collector plates (63) which are sequentially connected to both sides of the insulation plate (61).

7. The liquid treatment module of claim 1, wherein a graphite foil is utilized for the collector plates of the at least two power distribution panels (2), and the conductor plates (41) of the two or more double-sided electrode plates (4).

8. The liquid treatment module of claim 1, wherein the separator (10) comprises at least one layer of a net with openings or holes.

9. The liquid treatment module of claim 8, wherein the separator is a bag made of the net with four sides sealed and contains a double-sided electrode plate in the bag.

10. The liquid treatment module of claim 1, further comprising two liquid distributing pipes (8), wherein said two liquid distribution pipes (8) penetrate through the two liquid inlet and outlet holes on the two side plates (1), and are fastened to the two side plates (1) by flanges (7).

11. The liquid treatment module of claim 1, further comprising two liquid distributing pipes (8), wherein said two liquid distribution pipes (8) penetrate through the two liquid inlet and outlet holes on the side plates (1), the pipe guiding holes (25) on the power distribution panels (2), pipe guiding holes (43) on the two or more double-sided electrode plates (4), and are fastened to the side plates (1) by flanges (7).

12. A liquid treatment module, comprising at least two power distribution panels (2), electrode plates, and a framework (5) with two side plates (1), wherein the liquid treatment module has the following characteristics:
   a) the at least two power distribution panels (2) are dimensioned for attachment to the two side plates (1) by connectors (3), each of the at least two power distribution panels (2) having two pipe guiding holes (25);
   b) respective electrode plates (24) are connected to an inside part parts of each of the at least two power distribution panels (2), wherein each of the at least two power distribution panels (2) has an outside panel surface opposite to the inside part, and each of the two power distribution panels (2) is comprised of an insulation plate (21), the insulation plate (21) having a first plate surface for providing the outside panel surface, and a second plate surface attached to a conductor (22) and a collector plate (23) in sequence;
   c) two or more double-sided electrode plates (4) are stacked between the at least two power distribution panels (2);
   d) the at least two power distribution panels (2) are connectable to a DC power supply by electrical wires;
   e) a separator (10) is placed between at least two or more neighboring plates of said two or more double-sided electrode plates (4) to provide one or more liquid channels for liquid to pass through;
   f) each liquid channel is connected to two inlet and outlet holes on the side plates (1) through the two pipe guiding holes (25);
   g) exposed surfaces of the at least two power distribution panels (2), the double-sided electrode plates (4) and the separator (10) are bonded to a package (9) to provide support, seal and insulation; and
   h) two liquid distributing pipes (8), wherein said two liquid distribution pipes (8) penetrate through the two liquid inlet and outlet holes on the two side plates (1), and are fastened to the two side plates (1) by flanges (7), and wherein:
   the liquid distributing pipes (8) each include an outer pipe (82) and an inner pipe (83) located inside the outer pipe (82) with a same axis, and wherein for each liquid distributing pipe:
   both the outer pipe (82) and the inner pipe have slits along the axis for liquid to flow in and out;
   the two outer pipes (82) have liquid flow slits in the opposite directions, one up and one down;
   the inner pipe (83) has the slit in opposite direction with its corresponding outer pipe (82); and
   one end of the outer pipe (82) and inner pipe (83) are tightly connected by using sealing heads (81), another end of the outer pipe (82) and inner pipe (83) are connected and sealed by a cover (84).

13. A liquid treatment module, comprising at least two power distribution panels (2), electrode plates, and a framework (5) with two side plates (1), wherein the liquid treatment module has the following characteristics:
   a) the at least two power distribution panels (2) are dimensioned for attachment to the two side plates (1) by connectors (3)), each of the at least two power distribution panels (2) having two pipe guiding holes (25);
   b) respective electrode plates (24) are connected to an inside part of each of the at least two power distribution panels (2), wherein each of the at least two power distribution panels (2) has an outside panel surface opposite to the inside part, and each of the two power distribution panels (2) is comprised of an insulation plate (21), the insulation plate (21) having a first plate surface for providing the outside panel surface, and a second plate surface attached to a conductor (22) and a collector plate (23) in sequence;
   c) two or more double-sided electrode plates (4) are stacked between the at least two power distribution panels (2);
   d) the at least two power distribution panels (2) are connectable to a DC power supply by electrical wires;
   e) a separator (10) is placed between at least two or more neighboring plates of said two or more double-sided electrode plates (4) to provide one or more liquid channels for liquid to pass through;
   f) each liquid channel is connected to two inlet and outlet holes on the side plates (1) through the two pipe guiding holes (25);
   g) exposed surfaces of the at least two power distribution panels (2), the double-sided electrode plates (4) and the separator (10) are bonded to a package (9) to provide support, seal and insulation; and
   h) two liquid distributing pipes (8), wherein said two liquid distribution pipes (8) penetrate through the two liquid inlet and outlet holes on the side plates (1), pipe guiding holes (25) on the power distribution panels (2), pipe guiding holes (43) on the two or more double-sided electrode plates (4), and are fastened to the side plates (1) by flanges (7), wherein:
   the liquid distributing pipes (8) each include an outer pipe (82) and an inner pipe (83) located inside the outer pipe (82) with a same axis, and wherein for each liquid distributing pipe:
   both the outer pipe (82) and the inner pipe have slits along the axis for liquid to flow in and out;
   the two outer pipes (82) have liquid flow slits in the opposite directions, one up and one down;
   the inner pipe (83) has the slit in opposite direction with its corresponding outer pipe (82); and
   one end of the outer pipe (82) and inner pipe (83) are tightly connected by using the sealing heads (81), another end of the outer pipe (82) and inner pipe (83) are connected and sealed by the cover (84).

14. The liquid treatment module of claim 4, wherein a graphite foil is utilized for one or more of the collector plates of the at least two power distribution panels (2), the conductor plates (41) of the two or more double-sided electrode plates (4), and the collector plates (63) of the at least one intermediate power distribution panel (6).

15. The liquid treatment module of claim 6, wherein a graphite foil is utilized for the collector plates of the at least two power distribution panels (2), the conductor plates (41) of the two or more double-sided electrode plates (4), and the collector plates (63) of the at least one intermediate power distribution panel (6).

16. The liquid treatment module of claim 1, wherein said at least two power distribution panels (2) are connectable to a DC power supply by electrical wires so as to supply power onto the power distribution panels (2).

* * * * *